April 27, 1948. W. R. HAINSWORTH 2,440,583
ABSORPTION TYPE REFRIGERATION SYSTEM
Filed April 5, 1933
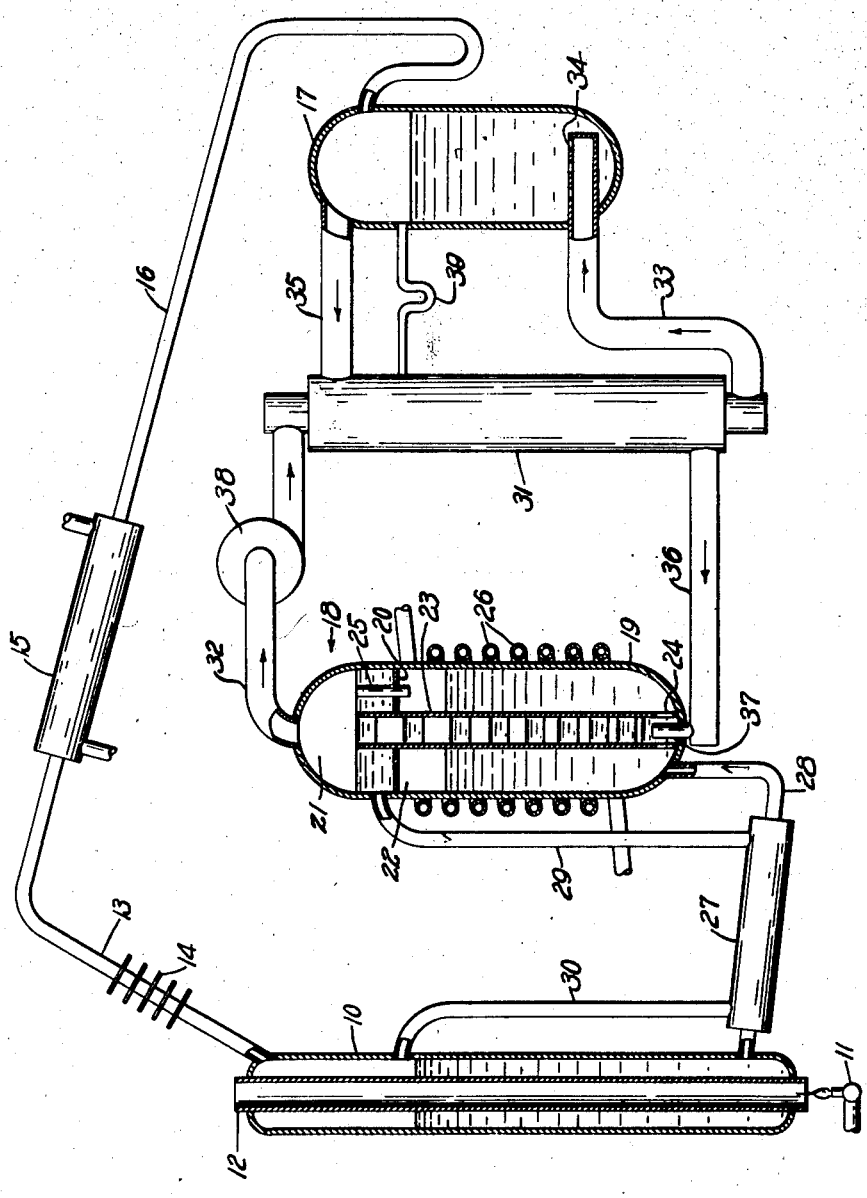
INVENTOR.
W. R. Hainsworth
BY
ATTORNEY.

Patented Apr. 27, 1948

2,440,583

UNITED STATES PATENT OFFICE 2,440,583

ABSORPTION TYPE REFRIGERATION SYSTEM

William R. Hainsworth, Larchmont, N. Y., assignor, by mesne assignments, to Servel, Inc., Dover, Del., a corporation of Delaware Application April 5, 1933, Serial No. 664,475

14 Claims. (Cl. 62—119.5)

1

This invention relates to absorption refrigerating systems of the continuous type in which an auxiliary medium is circulated between the evaporator and absorber.

In systems of this type, a suitable refrigerant fluid is distilled from solution in a generator into an evaporator. In the latter, the liquid refrigerant is evaporated and diffuses into an inert gas which circulates between the evaporator and an absorber. In the latter, the refrigerant vapor is absorbed out of the inert gas into solution which circulates between the generator and absorber.

It has been found by experience that when absorption of refrigerant vapor out of an inert gas is obtained by passing the gas mixture in contact with the surface of a liquid absorbent, the size of the apparatus is very much greater than that required when a similar absorption is obtained by bubbling the gases through the liquid. It therefore follows that by bubbling the gases through the liquid, the capacity of apparatus which is subject to certain space and structural limitations can be greatly increased.

This invention contemplates positive or forced circulation of gas and bubbling thereof through both liquid refrigerant in the evaporator and absorption liquid in the absorber, with resulting increase in capacity of refrigeration systems of this type.

Another object of this invention is to utilize the gas to cause circulation of liquid absorbent between the generator and absorber.

Other objects and advantages will be apparent from the following description taken in connection with the accompanying drawing in which the figure shows schematically, with parts in vertical section, a refrigeration system embodying this invention.

Referring to the drawing, a generator 10 containing a solution of refrigerant such as ammonia in an absorption liquid such as water is heated by a burner 11 in a flue 12 which extends vertically through the generator. Refrigerant vapor expelled from solution by heating in the generator flows in conduit 13 through a rectifier 14 to a condenser 15. From the condenser liquid refrigerant flows through conduit 16 to an evaporator 17.

In the embodiment of the invention illustrated, the absorber 18 comprises a vessel 19 divided by a partition 20 into an upper chamber 21 and lower chamber 22. A conduit 23 extends from the bottom of the chamber 22 upwardly through the partition 20 into the upper chamber 21 and is provided at its lower end with openings 24

2 affording communication with the chamber 22. A conduit 25 extending from the upper part of chamber 22 upwardly through the partition 20 in the chamber 21 is provided as an overflow and determines the liquid level in chamber 21 which should be above the level of liquid in the generator 10 as hereinafter set forth. Cooling means for the absorber is shown as a water circulation coil 26 but obviously both the absorber and condenser may be cooled in any known manner such as by air flow, secondary cooling systems, and the like.

The generator 10 and absorber 18 are interconnected through a liquid heat exchanger 27 for circulation of absorption liquid therebetween. The lower part of the generator is connected by conduit 28 which extends through the heat exchanger to the lower chamber 22 of the absorber, and the upper chamber 21 of the absorber is connected through conduit 29, liquid heat exchanger 27, and conduit 30 to the upper part of the generator.

The evaporator 17 and absorber 18 are interconnected through a gas heat exchanger 31 for the circulation therebetween of an auxiliary medium such as hydrogen. The upper part of chamber 21 of the absorber is connected through conduit 32, gas heat exchanger 31, and conduit 33 to the lower part of the evaporator 17. As shown, conduit 33 extends into the lower part of the evaporator where it is provided with openings 34 for gas below the liquid level in the evaporator. The upper part of the evaporator is connected through conduit 35, gas heat exchanger 31, and conduit 36 to the lower part of conduit 23 in the absorber 18. As shown, conduit 36 terminates in a pipe 37 which opens in the lower part of conduit 23 above the apertures 24. In conduit 32 of the gas circuit is provided a gas pump or blower 38 for positively circulating gas through the circuit in the direction indicated by the arrows. The small drain 39 from the evaporator to the gas heat exchanger 31 provides for return of overflow of excess liquid refrigerant to the absorption liquid circuit.

When the system is not in operation absorption solution stands to the same levels in the generator 10, chamber 22, and conduit 23 of the absorber 18. During operation, the generator 10 is heated by the burner 11 through the flue 12 and refrigerant vapor is expelled from solution as previously set forth. In the rectifier 14 absorption liquid vapor is condensed out of the refrigerant and drains back into the generator. Liquefied refrigerant delivered through conduit 16 from condenser 15 to the evaporator 17 accumulates in the latter to a level dependent upon the rate of evaporation, the upper level being limited by the overflow drain connection 39.

When the air pump or blower 38 is put into operation, the hydrogen is circulated in the direction indicated by the arrows. Beginning with the gas circuit in the evaporator 17, hydrogen passes through the openings 34 in the end of conduit 33 and bubbles upwardly through the liquid refrigerant. Evaporation of the latter and diffusion thereof into the hydrogen takes place and the resulting gas mixture flows from the evaporator through conduit 35, heat exchanger 31, and conduit 36 into the lower end of conduit 23 in the absorber 18 where it bubbles upwardly through the absorption solution therein. From the gas bubbles passing upwardly in conduit 23, refrigerant vapor is absorbed into solution and the hydrogen returns from chamber 21 of the absorber through conduit 32, heat exchanger 31, and conduit 33 back to the evaporator 17 and the cycle is repeated.

In conduit 23 of the absorber 18, not only is refrigerant vapor absorbed into solution, but the gas bubbles greatly decrease the weight of the fluid column in this conduit, wherefore the level increases until overflow occurs from the upper end of conduit 23 into the upper chamber 21 of the absorber. From chamber 21, which is located above the level of liquid in the generator 10, the enriched absorption solution returns to the generator by gravity through conduit 29, liquid heat exchanger 27, and conduit 30.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In a refrigeration system of the absorption type including a generator and an absorber interconnected for the circulation of absorption solution therebetween, and an evaporator containing a body of liquid refrigerant, flowing an inert gas by bubbling into and through said body of liquid refrigerant, and flowing the resulting gas mixture by bubbling through solution in said absorber to cause circulation of the solution between said absorber and generator and absorption of refrigerant vapor.

2. In an absorption refrigeration system, an absorber comprising a closed vessel divided into upper and lower chambers, a conduit within said vessel open at the lower end in said lower chamber, and at the upper end in said upper chamber, a generator, a connection for liquid from said generator to the lower chamber of said absorber, a return conduit from the upper chamber of said absorber to said generator, an evaporator, and a gas pump for circulating gas from said evaporator upwardly through said conduit in the absorber.

3. An absorption type refrigeration system comprising a generator, a condenser, an evaporator adapted to contain a body of liquid, an absorber, conduits interconnecting said generator and absorber for circulation of absorption liquid therebetween, conduits interconnecting said evaporator and absorber for circulation of inert gas therebetween, a blower for causing said circulation of inert gas, conduits connecting said condenser for reception of refrigerant vapor from said generator and delivery of refrigerant liquid to said evaporator, some of said parts being constructed and arranged so that inert gas is caused to bubble through the body of refrigerant liquid in said evaporator and then bubble into weak absorption liquid in said absorber, and means for utilizing the bubbling of gas in said absorber to cause said circulation of absorption liquid by gas lift action.

4. An absorption type refrigeration system including a generator, an absorber, an evaporator, a conduit for weakened absorption liquid from said generator to said absorber and arranged so that liquid is contained in said absorber and said generator at substantially the same surface level, a gas impellor for circulating inert gas between said evaporator and absorber and constructed and arranged so that gas is under sufficient pressure to cause it to bubble upwardly into liquid in said absorber, means utilizing the bubbling gas for raising liquid in said absorber to a level above that in said generator and absorber, and means for conducting liquid from said higher level to said generator.

5. In an absorption refrigeration system, a generator adapted to contain a solution of refrigerant in an absorption liquid, an evaporator adapted to contain a body of liquid refrigerant produced by distillation from said generator, means for withdrawing weakened absorption liquid from said generator, means including a blower for causing circulation of inert gas through said evaporator, and means for bubbling all of the gas after passage through said evaporator into the withdrawn weakened absorption liquid, and means utilizing the bubbling gas to raise the withdrawn absorption liquid to a level from which it may flow to said generator by gravity.

6. In a method of refrigeration which includes distillation of refrigerant fluid from solution in an absorption liquid in a heated zone, evaporation and diffusion of the distilled refrigerant fluid into an inert gas, and absorption of refrigerant fluid out of the inert gas into absorption liquid withdrawn from said heated zone, that improvement which consists in causing positive circulation of inert gas by kinetic action and bubbling the gas through both refrigerant liquid and weakened absorption liquid, and utilizing the bubbling of gas through the absorption liquid to raise the liquid to a level from which it may flow by gravity to said heated zone.

7. A method of refrigeration which includes maintaining a body of absorption liquid in a heated zone to cause expulsion of refrigerant fluid dissolved therein, liquefying the expelled refrigerant fluid, evaporating and diffusing the liquid refrigerant into an inert gas, withdrawing absorption liquid from said heated zone, cooling the withdrawn absorption liquid, applying kinetic force to bubble all of the inert gas into the cooled absorption liquid to cause absorption of refrigerant fluid out of the inert gas into the absorption liquid and elevation of the resulting enriched absorption liquid to a level from which it may flow to said heated zone by gravity.

8. The method of refrigeration which comprises, maintaining a body of liquid refrigerant, flowing an inert gas by bubbling into and through said body to cause evaporation and diffusion of refrigerant into the gas, flowing the resulting gas mixture by bubbling through a quantity of liquid absorbent for the refrigerant in a cooled zone, utilizing the flow of gas to cause circulation of the liquid absorbent between the cooled zone and a heated zone, and distilling refrigerant from absorbent in the heated zone to maintain said body of refrigerant.

9. A method of refrigeration which includes maintaining a body of absorption liquid in a heated zone, conducting absorption liquid from said heated zone to a cooled zone, maintaining a body of liquid refrigerant by distillation from absorption liquid in said heated zone, producing refrigeration by evaporation and diffusion of liquid refrigerant from said body into an inert gas, applying kinetic force to flow the inert gas containing evaporated refrigerant resulting from said production of refrigeration in contact with absorption liquid from said cooled zone by bubbling, and utilizing the bubbling gas to raise the absorption liquid to a level from which the liquid may flow by gravity to said heated zone.

10. A method of refrigeration which includes maintaining a body of absorption liquid in a heated zone, conducting absorption liquid from said heated zone to a cooled zone in a manner so that absorption liquid is maintained in said cooled zone in a body having substantially the same surface level as that in said heated zone, maintaining a body of liquid refrigerant by distillation from absorption liquid in said heated zone, applying a kinetic force to place an inert gas under sufficient pressure to cause it to bubble into absorption liquid from said cooled zone after first flowing in contact with said liquid refrigerant, and utilizing the bubbling gas to raise absorption liquid to a level above that in said zones from which higher level the liquid may flow by gravity to said heated zone.

11. In a continuous absorption refrigerating system of the type in which an inert gas is used as a pressure equalizing agent, the combination of a boiler, an absorber, an evaporator, gas conduits for circulating the inert gas between the evaporator and the absorber and for conveying refrigerant from the evaporator to the absorber, mechanical pumping means in one of said conduits for raising the pressure of the gas therein to a total pressure higher than that normally prevailing in the evaporator and means for circulating absorption liquid between the boiler and the absorber and utilizing the gas at the raised pressure to promote the liquid circulation.

12. In an absorption refrigeration system, a generator adapted to contain a solution of refrigerant in an absorption liquid, an evaporator adapted to contain a body of liquid refrigerant produced by distillation from said generator, means for withdrawing weakened absorption liquid from said generator, means including a blower for causing circulation of inert gas through said evaporator, and means for passing all of the gas after passage through said evaporator into the withdrawn weakened absorption liquid, and means utilizing the gas to raise the withdrawn absorption liquid to a level from which it may flow to said generator by gravity.

13. An absorption type refrigeration system comprising a generator, means for changing refrigerant vapor to a more dense state, an evaporator adapted to contain a body of liquid, an absorber, conduits interconnecting said generator and absorber for circulation of inert gas, conduits connecting said refrigerant vapor changing means for reception of refrigerant vapor from said generator and delivery of refrigerant liquid to said evaporator, some of said parts being constructed and arranged so that inert gas is introduced into the body of refrigerant liquid in said evaporator and then into weak absorption liquid in said absorber, and means for utilizing the gas in said absorber to cause said circulation of absorption liquid by gas lift action.

14. In combination, an absorption refrigeration system containing hydrogen as an inert gas and having a refrigerant generator, an absorber, an evaporator and a condenser, conduits interconnecting the generator, absorber, evaporator and condenser to provide an absorption solution circuit between said generator and absorber, and an inert gas circuit between said evaporator and absorber, said evaporator and absorber being positioned at different elevations, a gas circulating device within said inert gas circuit to circulate the gas therethrough under pressure, means for passing hydrogen under pressure into and through absorption liquid in said absorber as the liquid circulates therethrough, means for introducing hydrogen under pressure into and through refrigerant liquid in the evaporator and means for returning excess and unevaporated residue liquid in the evaporator to the absorption solution circuit.

WILLIAM R. HAINSWORTH.

REFERENCES CITED

The following references are of record in the file of this patent:

UNITED STATES PATENTS

| Number | Name | Date |
| --- | --- | --- |
| Re. 21,894 | Randel | Sept. 2, 1941 |
| 1,659,681 | Davenport | Feb. 21, 1928 |
| 1,678,277 | Von Platen | July 24, 1928 |
| 1,738,720 | Munters | Dec. 10, 1929 |
| 1,818,587 | Smellie | Aug. 11, 1931 |
| 1,854,565 | Smith | Apr. 19, 1932 |
| 1,856,765 | Hull | May 3, 1932 |
| 1,874,621 | Randel | Aug. 30, 1932 |
| 1,882,254 | Randel | Oct. 11, 1932 |
| 2,027,927 | Nelson | Jan. 14, 1936 |
| 2,052,580 | Randel | Sept. 1, 1936 |
| 2,240,173 | Coons et al. | Apr. 29, 1941 |

FOREIGN PATENTS

| Number | Country | Date |
| --- | --- | --- |
| 212,256 | Great Britain | Mar. 5, 1925 |